United States Patent
Green

(10) Patent No.: US 7,212,206 B2
(45) Date of Patent: May 1, 2007

(54) METHOD AND APPARATUS FOR SELF SHADOWING AND SELF INTERREFLECTION LIGHT CAPTURE

(75) Inventor: Robin J. Green, Redwood City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 203 days.

(21) Appl. No.: 10/645,694

(22) Filed: Aug. 20, 2003

(65) Prior Publication Data

US 2005/0041023 A1 Feb. 24, 2005

(51) Int. Cl.
G06T 15/60 (2006.01)
G09G 5/00 (2006.01)

(52) U.S. Cl. ...................... 345/426; 345/582
(58) Field of Classification Search .............. 345/426
See application file for complete search history.

(56) References Cited

U.S. PATENT DOCUMENTS

| | | | |
|---|---|---|---|
| 6,639,595 B1* | 10/2003 | Drebin et al. ............... | 345/426 |
| 6,672,964 B2* | 1/2004 | Kobayashi .................... | 463/43 |
| 2001/0028352 A1* | 10/2001 | Naegle et al. .............. | 345/501 |
| 2002/0126133 A1* | 9/2002 | Ewins ......................... | 345/587 |
| 2003/0179197 A1* | 9/2003 | Sloan et al. ................. | 345/426 |

FOREIGN PATENT DOCUMENTS

EP 1 189 173 A2 3/2002
WO WO 98/45815 10/1998

OTHER PUBLICATIONS

Jonathan Cohen, Marc Olano, Dinesh Manocha, "Appearance-Preserving Simplification," Jul. 1998, Proceedings of the 25th Annual Conference on Computer Graphics and Interactive Techniques, p. 115-122□□.*
P. Cignoni, C. Montani, R. Scopigno, C. Rocchini, "A General Method for Preserving Attribute Values on Simplified Meshes," Oct. 1998, Proceedings of the Conference on Visualization, p. 59-66.*
Peter-Pike Sloan, Jan Kautz, John Snyder, "Precomputed Radiance Tansfer for Real-Time Rendering in Dynamic, Low-Frequency Lighting Environments," Jul. 23, 2002, ACM Transactions on Graphics, v. 21, n. 3.*

(Continued)

Primary Examiner—Ulka Chauhan
Assistant Examiner—Jason M. Repko
(74) Attorney, Agent, or Firm—Martine Penilla & Gencarella, LLP

(57) ABSTRACT

A method for rendering an image with high resolution lighting characteristics is provided. The method initiates with generating a texture map associated with the image. The texture map is defined by texels. Then, a value representing a lighting characteristic for each of the texels is calculated. Next, the value is stored. Then, a coordinate space of the texture map is associated with a display screen coordinate space. Next, the image is rendered on a display screen using the stored value. A method for incorporating the lighting characteristics of an image into a texture map is also provided. A computing device and integrated circuit both configured to present real time shadowing effects are also provided.

21 Claims, 16 Drawing Sheets

OTHER PUBLICATIONS

Jonathan Cohen, Marc Olano, Dinesh Manocha, "Appearance-Preserving Simplification," Jul. 1998, Proceedings of the 25th Annual Conference on Computer Graphics and Interactive Techniques, p. 115-122.*

Peter-Pike Sloan, Jan Kautz, John Snyder, "Precomputed Radiance Transfer for Real-Time Rendering in Dynamic, Low-Frequency Lighting Environments," Jul. 23, 2002, ACM Transactions on Graphics, vol. 21, No. 3, p. 527-536.*

Hadwiger et al, "*Hardware-Accelerated High-Quality Filtering on PC Hardwar*", International Workshop on Vision, Modeling and Visualization. Proceedings, XX, XX, Nov. 21, 2001, p. 105-112, 520, XP009027713.

McCool et al., "*Texture Shaders*", Proceedings 1999 Eurographics / SIGGRAPH Workshop on Graphics Hardware. Los Angeles, California, Aug. 8-9, 1999, SIGGRAPH / Eurographics Workshop on Graphics hardware, New York, NY: ACM, US, Aug. 8, 1999, pp. 117-126, 144, XP000977118.

Green, "*Spherical Harmonic Lighting: The Gritty Detail*", XP-002308100, Retrieved from the Internet: URL:http://www.research.scea.com/research/research.html, Jan. 16, 2003.

Kautz et al., "*Fast, Arbitrary BRDF Shading for Low-Frequency Lighting Using Spherical Harmonics*", Proceedings of the 13$^{th}$ Eurographics Workshop on Rendering, PISA, Italy 2002. Eurographics Workshop Proceedings ACM New York, NY, USA, 2002, pp. 291-335, XP002308101.

Heidrich et al., "*Realistic, Hardware-accelerated Shading and Lighting*", Computer Graphics. SIGGRAPH 99 Conference Proceedings. Los Angeles, California, Aug. 8-13, 1999, Computer Graphics Proceedings. SIGGRAPH, New York, NY: ACM, US, Aug. 8, 1999, pp. 171-178, XP001032897.

Watt, A., "3D Computer Graphics", 2000, Addison-Wesley, Harlow, England, GB, pp. 205-262, 275-305, XP002342548, Chapters 7.3, 7.7, 8: Introduction, 8.5, 10.1.1, 10.1.2.

Watt et al., "3D Games", 2001, Addison-Wesley, Harlow, England, GB, pp. 215-244, 314-328, XP002342549, Chapters 7.1, 10.1, 10.6.1.

* cited by examiner

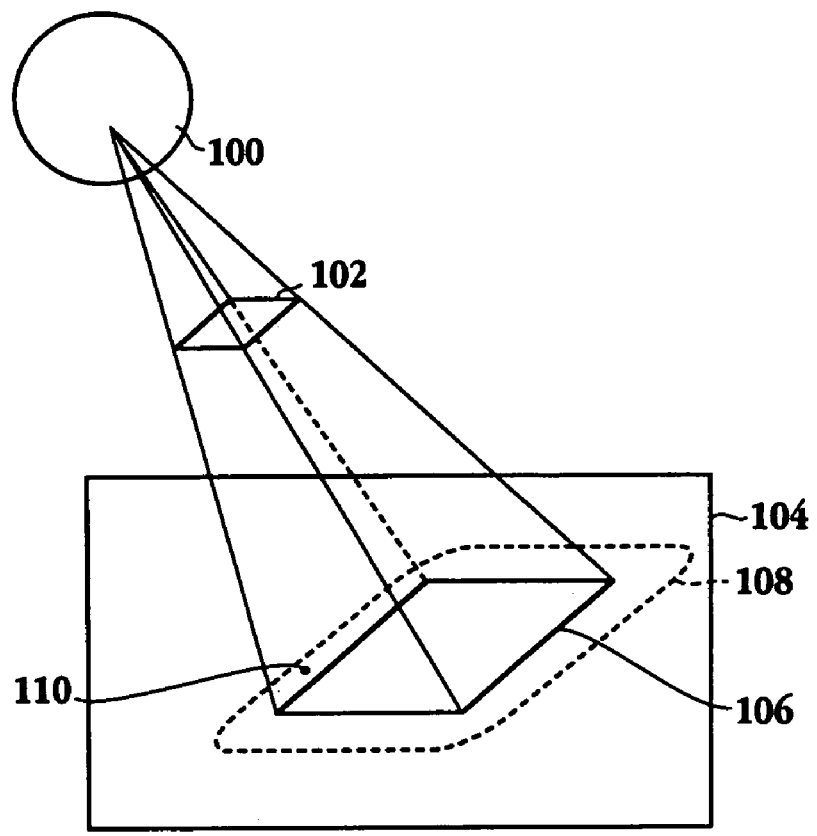
Fig. 1 *(prior art)*

METHOD AND APPARATUS FOR SELF SHADOWING AND SELF INTERREFLECTION LIGHT CAPTURE

CROSS REFERENCE TO RELATED APPLICATION

This application is related to U.S. patent application Ser. No. 10/645,819, filed on the same day as the instant application and entitled "METHOD AND APPARATUS FOR REAL TIME GLOBAL ILLUMINATION INCORPORATING STREAM PROCESSOR BASED HYBRID RAY TRACING," which is incorporated herein by reference for all purposes.

BACKGROUND OF THE INVENTION

1. Field of the Invention

This invention relates generally to video processing and more particularly to providing real-time shading model for rendering objects on a display.

2. Description of the Related Art

Game developers are constantly refining image synthesis to create a technique that presents a realistic visual impression for users. One aspect of image synthesis that is used to present a realistic visual impression is the accurate portrayal of shadows and shading. Normal lighting for computer games rely on vector dot product calculations, which are relatively simple, but inaccurate. While the vector dot product calculations are able to present hard edge shadows, theses type of calculations cannot present soft edge shadows.

FIG. 1 is a schematic diagram representing an exemplary lighting computation scheme for rendering a display. Light source 100 includes a number of points that emit light. Occlusion surface 102 blocks a portion of the light from light source 100 that is directed to surface 104. Thus, a hard edge shadow (the umbra) is defined by region 106 from occlusion surface 102. However, point 110, which lies in soft shadow (or penumbra) region 108, requires that multiple points on light source 100 be picked out and the shadow projection for each of the points is determined. Each of the shadow projections is then summed, therefore, with respect to point 110 the summation of a number of lighting functions is required to realistically display points in soft shadow region 108. However, the calculation and summation of the lighting functions are computationally intensive and not viable alternatives for presenting realistic shading in real time. Furthermore, adding another light source, which is common especially in video games, requires another complete calculation.

One attempt to address this shortcoming is the use of a special case list which may be used to define the shading properties when certain criteria are met. However, the special case list is not exhaustive and as a result the list must be updated for each new situation. Moreover, the attempt to force a particular situation to fit a special case may result in sub-optimal display quality. Additionally, the special case list acts as a restriction on the game developer.

As a result, there is a need to solve the problems of the prior art to provide a method and apparatus for providing a shading scheme capable of rendering a realistic representation in real time.

SUMMARY OF THE INVENTION

Broadly speaking, the present invention fills these needs by providing a method and apparatus that simplifies the lighting function through the use of omni-directional basis functions, and in combination with texture mapping, provides for the real time display of realistic shading with minimal computations. It should be appreciated that the present invention can be implemented in numerous ways, including as a method, a system, computer readable medium or a device. Several inventive embodiments of the present invention are described below.

In one embodiment, a method for rendering an image with high resolution lighting characteristics is provided. The method initiates with generating a texture map associated with the image. The texture map is defined by texels. Then, a value representing a lighting characteristic for each of the texels is calculated. Next, the value is stored. Then, a coordinate space of the texture map is associated with a display screen coordinate space. Next, the image is rendered on a display screen using the stored value.

In another embodiment, a method for incorporating lighting characteristics of an image of an object into a texture map is provided. The method initiates with defining a texture map associated with the image. Next, a lighting characteristic associated with a texel of the texture map is determined. Then, the texel is associated with the lighting characteristic.

In yet another embodiment, a method for rendering an image is provided. The method initiates with defining a texture map associated with the image. Then, a value corresponding to a multi-directional signal is associated with a texel of the texture map. Next, an intensity of a pixel associated with the texel is determined. When determining the intensity, the method includes accessing the value associated with the texel, and applying the value to a quantity representing a light source component.

In still yet another embodiment, a computer readable medium having program instructions for rendering an image with high resolution lighting characteristics is provided. The computer readable medium includes program instructions for accessing a lighting characteristic value associated with a texel of a texture map associated with the image. Program instructions for associating a coordinate space of the texture map with a display screen coordinate space are included. Program instructions for applying the lighting characteristic value to a corresponding pixel for presentation on the display screen are also provided.

In another embodiment, a computer readable medium having program instructions for incorporating lighting characteristics of an image of an object into a texture map is provided. The computer readable medium includes program instructions for defining a texture map associated with the image. Program instructions for determining a lighting characteristic associated with a texel of the texture map are provided. Program instructions for associating the texel with the lighting characteristic are included.

In yet another embodiment, a computing device is provided. The computing device includes a memory capable of storing data representing a texture map associated with an image. The texture map contains a texel. The texel is associated with data describing a light field for a point within the texel according to a basis function. The computing device includes logic for mapping the texel to a pixel associated with a display screen in communication with the computing device. Logic for accessing the data describing the light field is provided. Logic for determining an intensity associated with the pixel based upon the data describing the light field and logic for enabling presentation of the intensity of the pixel on the display screen are included.

An integrated circuit is provided. The integrated circuit includes a memory capable of storing data corresponding to a self shadow and self interreflection lighting characteristics of an image. Circuitry for accessing the data is provided. Circuitry for determining an intensity associated with a pixel based upon a product of the data and an illumination value is included. Circuitry for enabling presentation of the intensity of the pixel on the display screen is included.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1 is a schematic diagram representing an exemplary lighting computation scheme for rendering a display.

DETAILED DESCRIPTION OF THE PREFERRED EMBODIMENTS

Figure 2A:
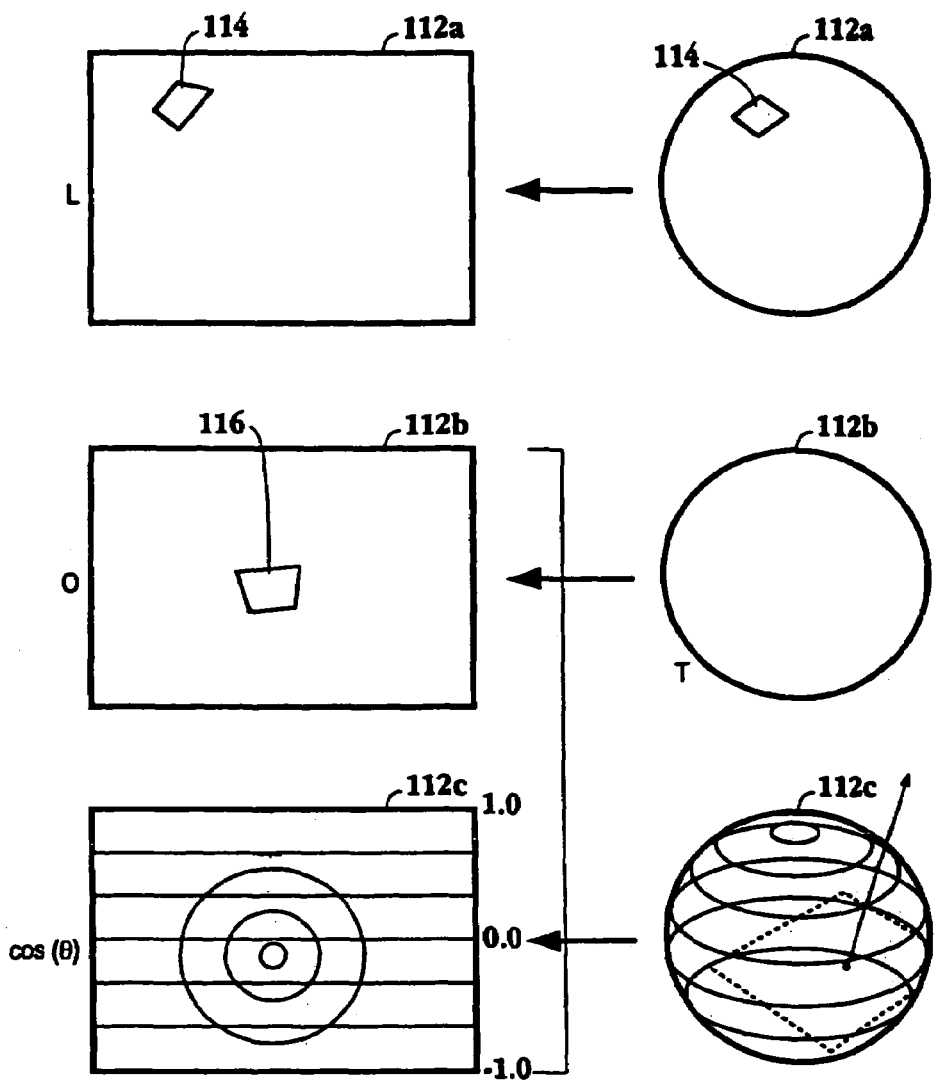
FIG. 2A is a simplified schematic diagram illustrating three components of a basis function used for eventual derivation of a lighting function in accordance with one embodiment of the invention.

An invention is described for a system, apparatus and method that enables real time presentation of soft shadows for a video presentation, such as a video game, with minimal computationally intensive calculations. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section.

The embodiments of the present invention provide a system and method for allowing real time presentation of realistic shadows during a video presentation, such as in a video game. In one embodiment, spherical harmonics, a mathematical system analogous to the Fourier transform but defined across the surface of a sphere simplify the rendering equation into a dot product over the spherical harmonic coefficients. In one embodiment, a representation of the incoming illumination is multiplied by a representation of surface reflectance, referred to herein as the transfer function (T). It will be apparent to one skilled in the art that the orthogonality of spherical harmonic functions provide that the integral of the function's products is the same as the dot product of functions respective coefficients. Therefore, the lighting function is collapsed to a dot product of the coefficients of a luminance function (also referred to as an illumination function) describing the incoming light from all directions and the coefficients of a transfer function describing the surface reflectance. The transfer function when dotted with luminance function, i.e., multiplied and integrated, yields the approximated lighting for a respective point. It should be appreciated that different types of transfer functions may be generated for diffuse surfaces, wherein the different types of transfer functions are associated with varying degrees of calculation complexity. Further information related to the different types of transfer functions and spherical harmonic lighting in general may be found in the article entitled "Spherical Harmonic Lighting: The Gritty Details", Robin Green, Jan. 16, 2003, which is hereby incorporated by reference for all purposes. It should be appreciated that the transfer and illumination functions described herein are capable of being defined over all directions using a parameterization of directions. The parameterization of directions may be spherical, cubical, cylindrical, etc. Additionally, the transfer and illumination functions may be expressed as the sum of any suitable basis functions. Exemplary basis functions include spherical harmonic basis functions, wavelet, lapped basis functions, etc., wherein each of these basis functions are orthogonal, orthonormal, or otherwise.

In one embodiment of the invention, the data captured through the transfer function is stored in memory along with texture map data. In one embodiment, a lighting basis function is sampled at the center of a texel and the resulting coefficient is stored, as opposed to calculating the lighting function at the corners of triangles. Thus, the need for interpolating from triangle vertices is eliminated. As will be explained in more detail below, a high resolution object is used to work out where the shadows are defined and the nature of the intensity of the shadows. That is, the self shadowing and the self interreflection properties of the image are captured through the transfer function. The use of a high resolution for the determination of the shadows allows for the data derived from the high polygon model to be stored and applied to a low polygon model in order to give a high resolution appearance to the low resolution image. In one embodiment, a one to one mapping between points in three dimensional space to points in two dimensional space enable a look-up operation for determining the corresponding pixel location associated with the stored transfer function data.

FIG. 2A is a simplified schematic diagram illustrating three components of a basis function used for eventual derivation of a lighting function in accordance with one embodiment of the invention. The three components represent the illumination function (L), the occlusion function (O), and a cosine term ($\cos(\theta)$). It should be appreciated that surfaces 112a, 112b, and 112c each represent a surface of a corresponding globe which has been "unwrapped." The illumination function (L) component determines the amount incoming light to a particular point from light source 114. It should be further appreciated that surface 112a may be referred to as a theta to phi parameterization. The occlusion function (O) represents an area of the light source that is blocked, i.e., occluded from the point. Shadow area 116 illustrates the area that is blocked or occluded from the light source. The third term of the spherical function is the cosine term. The cosine term represents the ratio of light reflected off of a surface when illuminated from a specific direction. The cosine term is non-zero over the upper hemisphere of sphere 112c relative to the surface normal. The occlusion component and the cosine component may be combined to define the transfer function (T). The transfer function describes the lighting characteristics related to self transfer and self shadowing for a particular point on an object.

One skilled in the art will appreciate that spherical harmonics based functions are related to orthogonal polynomials, thereby allowing the representation of a function to be broken down to discrete polynomials through the summation of the terms of an equation. Furthermore, spherical harmonics based functions are rotationally invariant. That is, with reference to video games, using spherical harmonic based functions guarantee that during the animation of scenes, moving lights and rotating objects, the intensity of lighting will not fluctuate, crawl, pulse or have any other objectionable artifacts associated with other shading techniques. Furthermore, the addition of a light source does not require another complete calculation when utilizing spherical harmonics based functions for determining the lighting function.

As mentioned above, the transfer function (T), which includes the occlusion component and the cosine component, represents a description of the surface reflectance. The integration of the illumination function (L) and the transfer function (T) over an entire sphere may be simplified to a sum of dot products of their coefficients through the application of orthogonal basis functions. Accordingly, the lighting function may be collapsed into the multiplication of two different functions based on the rendering equation. Thus, a series of multiplication and addition operations resulting from this collapse of the lighting function enables for a relatively fast operation in the conversion of the integration over a sphere to determine lighting characteristics for an object being rendered. Consequently, the real-time presentation of realistic shading, as defined by the transfer function, may be implemented into a video game. Additionally, the basis functions provide soft shadows with a minimal amount of work and thereafter hard shadows may be defined through further calculation. Traditional approaches provide hard shadows initially and then require complex calculations to define the soft shadows. Further information on the spherical harmonic lighting technique, and spherical basis functions in general, is disclosed in the article entitled "Spherical Harmonic Lighting: The Gritty Details", Robin Green, Jan. 16, 2003, which has been incorporated by reference for all purposes. It will be apparent to one skilled in the art that the invention described herein may be utilized with any suitable basis function and is not limited to the spherical harmonic functions described herein. For example, a wavelet decomposition may be used as well as spherical basis functions. It will be apparent to one skilled in the art that a wavelet is an additional way of representing a signal as a sum of frequencies. The basis functions may be defined across any parameterization of the directional domain, for example, a spherical, a hemispherical, a cubical, a conical or a cylindrical parameterization. Additionally, these basis functions may be orthogonal, orthonormal, lapped or otherwise.

Figure 2B:
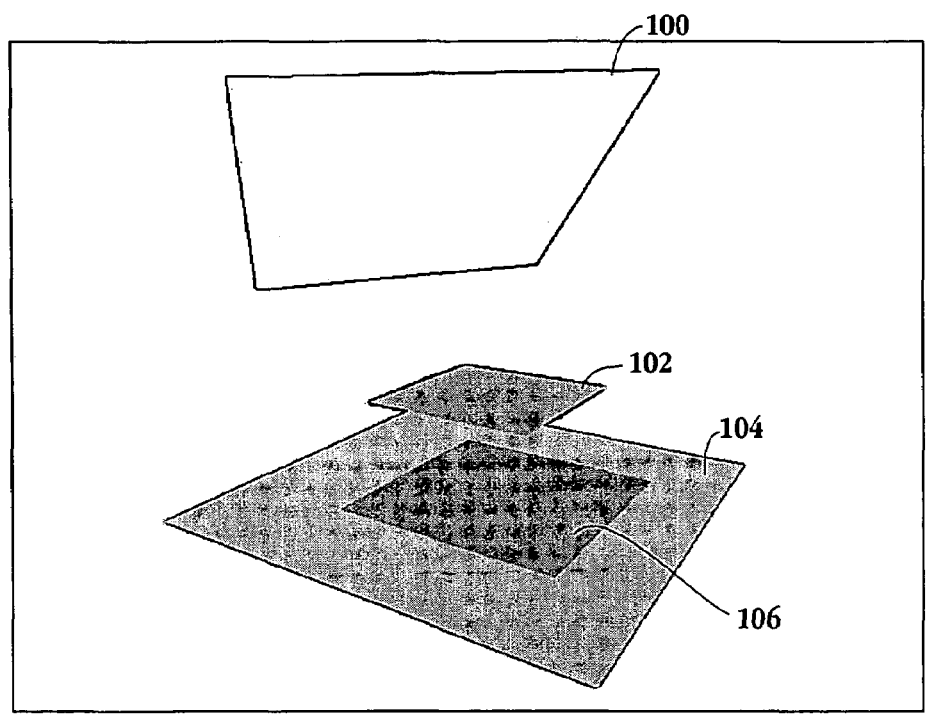
FIGS. 2B–2G are simplified schematic diagrams for alternatively representing the components of a basis function for use in deriving a lighting function.
Figure 2C:
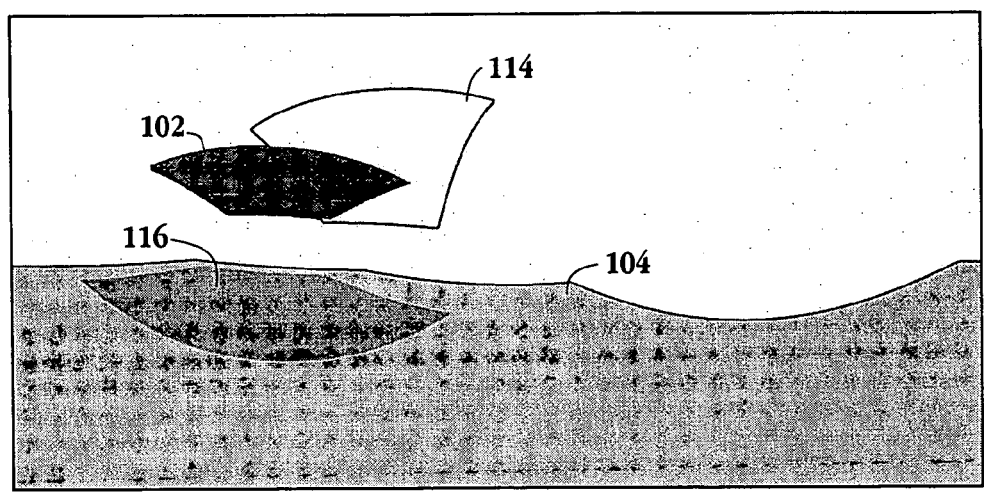
Figure 2D:
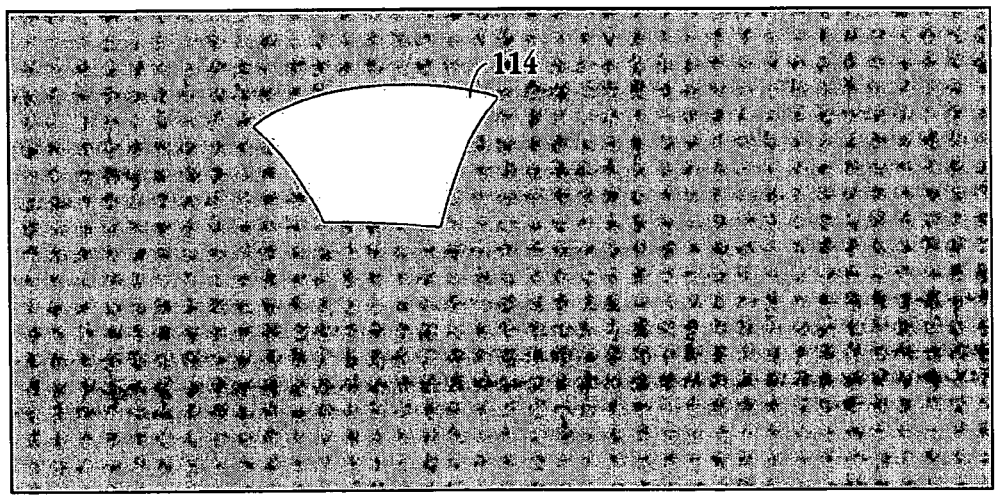
Figure 2E:
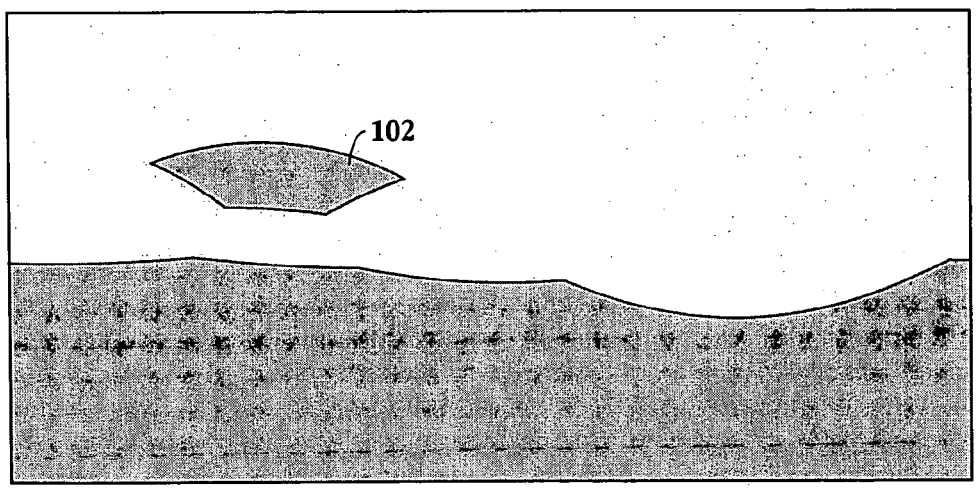
Figure 2F:
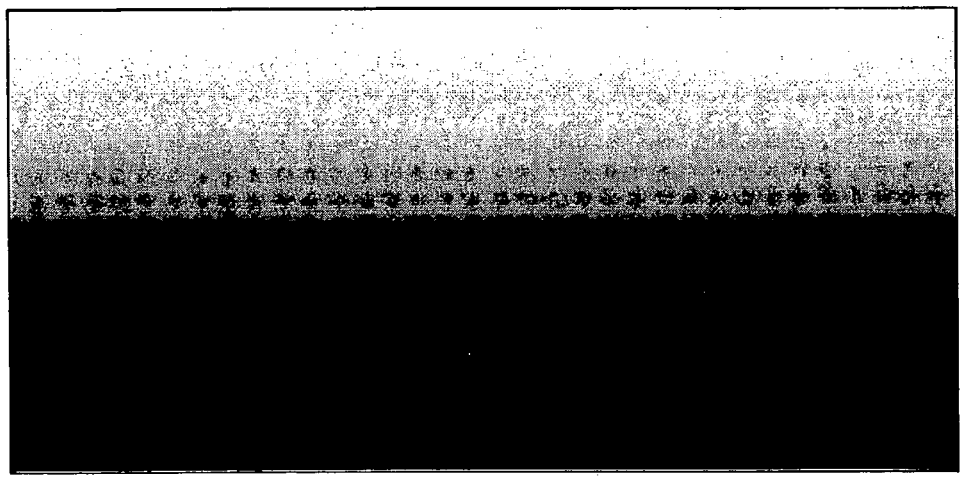
Figure 2G:
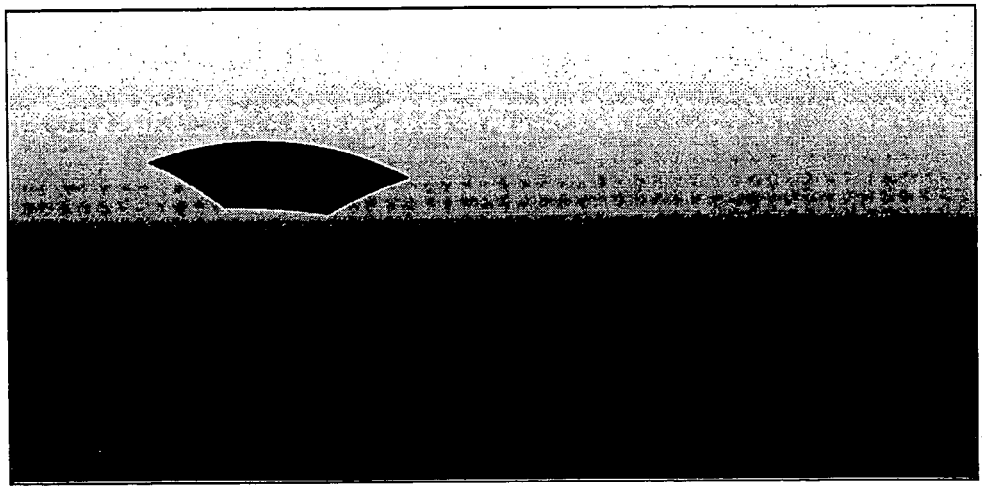

FIGS. 2B–2G are simplified schematic diagrams for alternatively representing the components of a basis function for use in deriving a lighting function. Here, FIGS. 2B–2G provide an alternative representation to FIG. 2A. FIG. 2B includes light source 100, occlusion surface 102 blocks a portion of the light thereby defining umbra 106 on surface 104. Thus, in FIG. 2B there are no soft shadows defined. FIG. 2C represents a point on surface 104 being lit, as represented through an unwrapped spherical function. FIG. 2D represents the lighting function (L) component of the spherical function. FIG. 2E represents the visibility function, also referred to as the occlusion function (O). FIG. 2F represents the cosine term ($\cos(\theta)$). It should be appreciated that the basis function for the lighting characteristics may be expressed as the product of the lighting function represented by FIG. 2D, the visibility function represented by FIG. 2E, and the cosine term represented by FIG. 2F. FIG. 2G represents the transfer function. One skilled in the art will appreciate that the transfer function representation of FIG. 2G excludes the lighting function of FIG. 2D, i.e., the transfer function is a combination of the visibility function of FIG. 2E and the cosine term of FIG. 2F.

Figure 3:
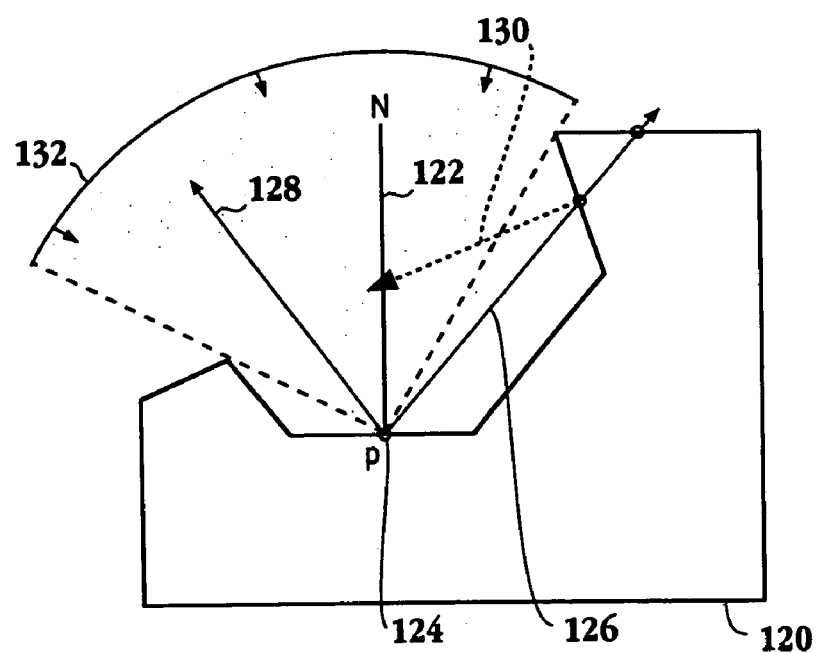
FIG. 3 is a schematic diagram illustrating a polygon wherein ray tracing techniques are used to define a lighting function at points on a surface of the polygon in accordance with one embodiment of the invention.

FIG. 3 is a schematic diagram illustrating a polygon wherein ray tracing techniques are used to define a lighting function at points on a surface of the polygon in accordance with one embodiment of the invention. Point P 124 is on a surface of polygon 120. The normal 122 to P is also shown. Here, rays are traced from a point, e.g., point P 124, through the polygon database in order to define any hits. For example, ray 126 is traced from point P 124 and will eventually hit a side of polygon 120 and reflect as illustrated by ray 130. On the other hand, ray 128 does not hit any sides of polygon 120, i.e., is visible to the outside world. Arc 132 represents the amount of the outside world that point P can see. The ray tracing information distributes light, i.e., self-transfer. The self-transfer, also referred to as self-interreflection, is determined by the rays representing light being bounced off the surfaces of polygon 120 to further illuminate the region. In addition, it should be appreciated that with each bounce off of a wall of the polygon the associated light ray will lose a certain amount of energy. Further information on ray tracing techniques may be found in the article entitled "Spherical Harmonic Lighting: The Gritty Details" referenced above.

Figure 4A:
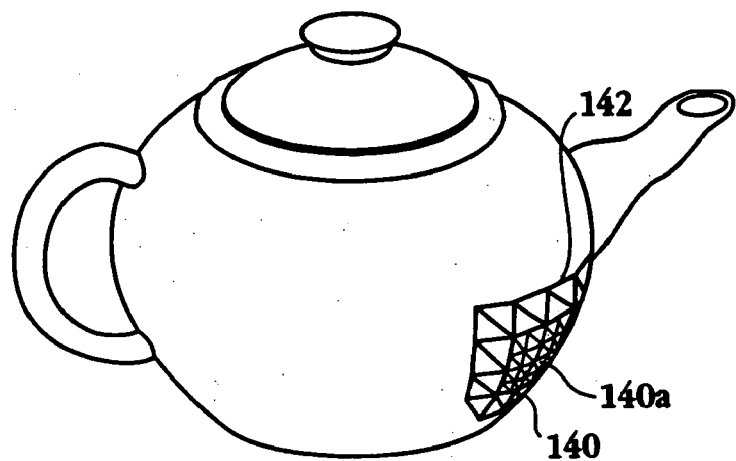
FIG. 4A is a simplified schematic diagram of the use of Gouraud shading.

FIG. 4A is a simplified schematic diagram of the use of Gouraud shading. As is known, Gouraud shading uses a number of triangles in order to smoothly interpolate the shading of a region. Here, region 140 is shown with a plurality of small triangles in order to more accurately capture the shading in the region. However, region 142 consists of larger triangles where it is not necessary to capture the amount of shading to a great detail in that area. In order to provide an accurate shading picture, Gouraud shading requires that many small triangles be defined in the particular area. The lighting characteristics at each of the corners of the triangles are calculated and then through linear interpolation the shading for the entire triangle is determined.

Figure 4B:
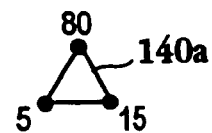
FIG. 4B illustrates a schematic diagram illustrating the process of linear interpolation.

FIG. 4B illustrates a schematic diagram illustrating the process of linear interpolation. The corners of triangle 140*a* may be associated with values representing the lighting at each of the corners of triangle 140*a*. Thus, in one corner, the value of eighty is represented while in another corner a value of fifteen, and in a third corner, a value of five is represented. Through linear interpolation the shading of the entire triangle is then determined by the relative weights of each corner, i.e., a point closer to the corner having a weight of eighty will have a value more closely related to eighty. It should be appreciated that the computation of the polygons, i.e., triangles, is intensive and precludes the real-time presentation shading for video games due to the computations required for presenting soft shadows. Furthermore, when a light source is added or changed, the entire calculation must be repeated in order to render the image.

Figure 5:
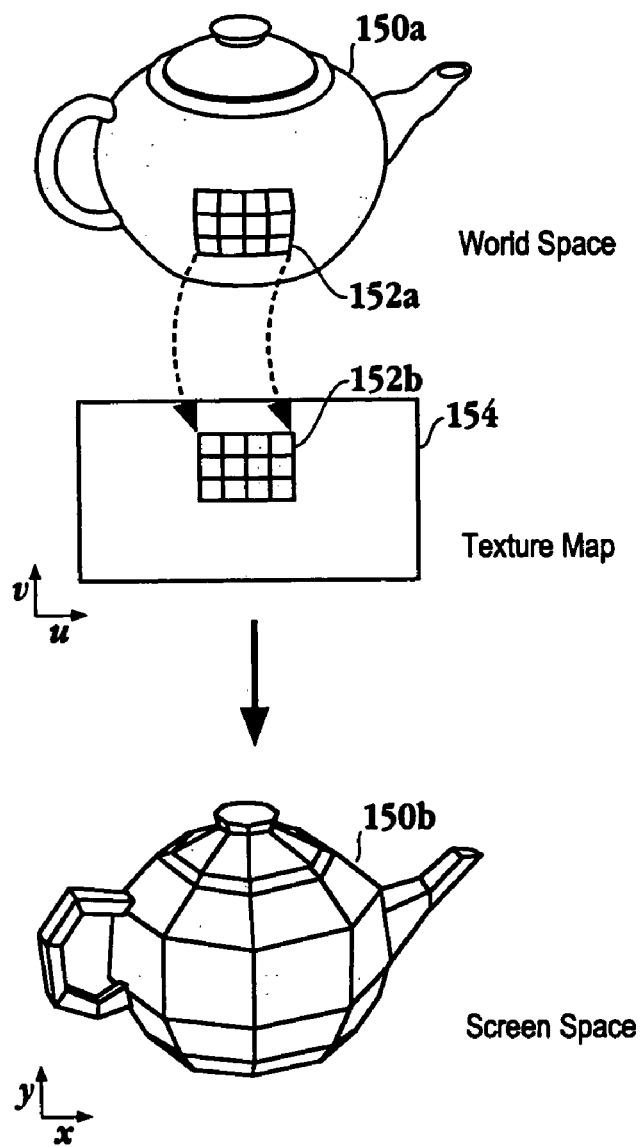
FIG. 5 is a schematic diagram illustrative of a scheme for embedding lighting coefficients into a texture map in accordance with one embodiment of the invention.

FIG. 5 is a schematic diagram illustrative of a scheme for embedding lighting coefficients into a texture map in accordance with one embodiment of the invention. Object 150*a*, or more specifically, the points that make up object 150*a*, are projected from world space, also referred to as 3-dimensional space, to texture map 154. For example, region 152*a* of object 150*a* is mapped from three dimensional space to texture map 154 coordinate space, which is generally represented as (u,v) coordinates. Thus, region 152*b* in texture map space corresponds to region 152*a* in three dimensional space. The (u,v) coordinates of the texture map are correlated to screen space for rendering object 150*b* on a display screen. In one embodiment, the texels, which define texture map 154, include data representing the lighting characteristics associated with the texel. In another embodiment, the spherical harmonic lighting function, as described in the article entitled "Spherical Harmonic Lighting: The Gritty Details," which has been incorporated by reference, is sampled at the center of each texel and the resulting coefficients or values are stored in memory. Thus, for each texel, the occlusion and cosine functions, which make up the transfer function (T), may be cached in memory of a computing device. Consequently, the illumination function (L) may be determined and the lighting function becomes a dot product of the cached transfer function (T) value and the illumination source (L). With respect to video games the computing device may be a video game console, e.g., the "PLAYSTATION 2"® manufactured by Sony Computer Entertainment Inc.

It should be appreciated that there is no need to calculate polygons as is required with traditional shading schemes such as Gouraud shading. Through the application of spherical basis functions, such as spherical harmonic functions, the speed of rendering become independent of the size and number of light structures. In particular, with respect to video games, light sources are constantly changing. Accordingly, a value for the illumination function (L), representing the light source(s) is readily determined and combined with the stored transfer function value to provide real-time shading for an application. That is, the transfer function (T) value remains constant and is calculated once and stored. It should be appreciated that the stored transfer function value corresponds to a multi-directional signal which may be defined through ray-tracing in one embodiment.

Figure 6:
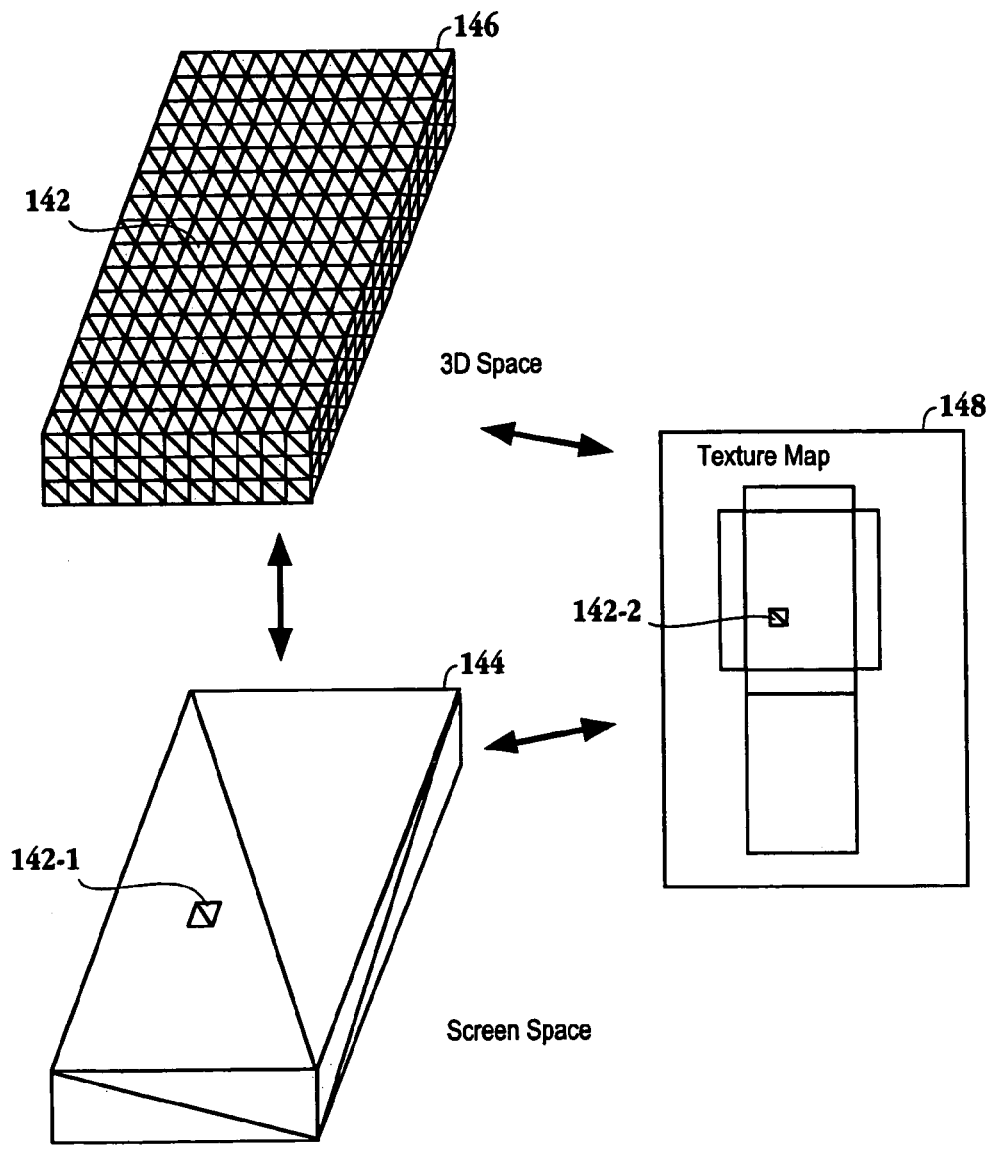
FIG. 6 is a schematic diagram illustrating the interrelationship between the two dimensional and three dimensional coordinate spaces encountered for the real-time shading display of an object in accordance with one embodiment of the invention.

FIG. 6 is a schematic diagram illustrating the interrelationship between the two dimensional and three dimensional coordinate spaces encountered for the real-time shading display of an object in accordance with one embodiment of the invention. As mentioned above, the lighting characteristic, i.e., shadow properties, for an image are enabled to be presented in real time by inserting lighting function data in each texel of a texture map. The lighting function data captures the self shadowing and the self interreflection characteristics through the application of the transfer function (T). In one embodiment, a high resolution rendition of an object is used to capture the lighting function data. The lighting function data is then stored and applied to a low resolution model. The low resolution model is made to appear as having a high resolution when the lighting function data is applied to the low resolution model.

Still referring to FIG. 6, object 142 is a high resolution rendition in three dimensional space. In order to provide the high resolution, a large number of polygons 142, e.g., thousands of polygons, are defined on object 146. A one-to-one mapping of the points in three dimensional space to points in two dimensional space is performed. Thus, the texels defined by texture map 148 correlate to the points on object 142 through this mapping. For example, texel 142-2 may correspond to polygon 142. As is generally known, texturing may be analogized to wrapping a three dimensional object in two dimensional gift paper. As discussed above with reference to FIG. 5, texel 142-2 is associated with data representing a lighting characteristic, e.g., transfer function, derived from a spherical basis function. Thus, when rendering a two dimensional image 144 of three dimensional object 146 in screen space, a low resolution image is given the appearance of a high resolution image. That is, data representing the lighting characteristics of a high resolution image defined by thousands of polygons are captured by texture map 148. The captured lighting characteristics are then projected from texture map 148 to two dimensional image 144 that is presented on a display screen. As can be seen in FIG. 6, image 144 is a low resolution image defined by 12 polygons (6 polygons being shown). However, the lighting characteristics, e.g., shading, shadows, etc., for image 144 are derived from image 146 defined by thousands of polygons. Accordingly, these lighting characteristics may be projected onto a low resolution image to provide a high resolution appearance.

Figure 7:
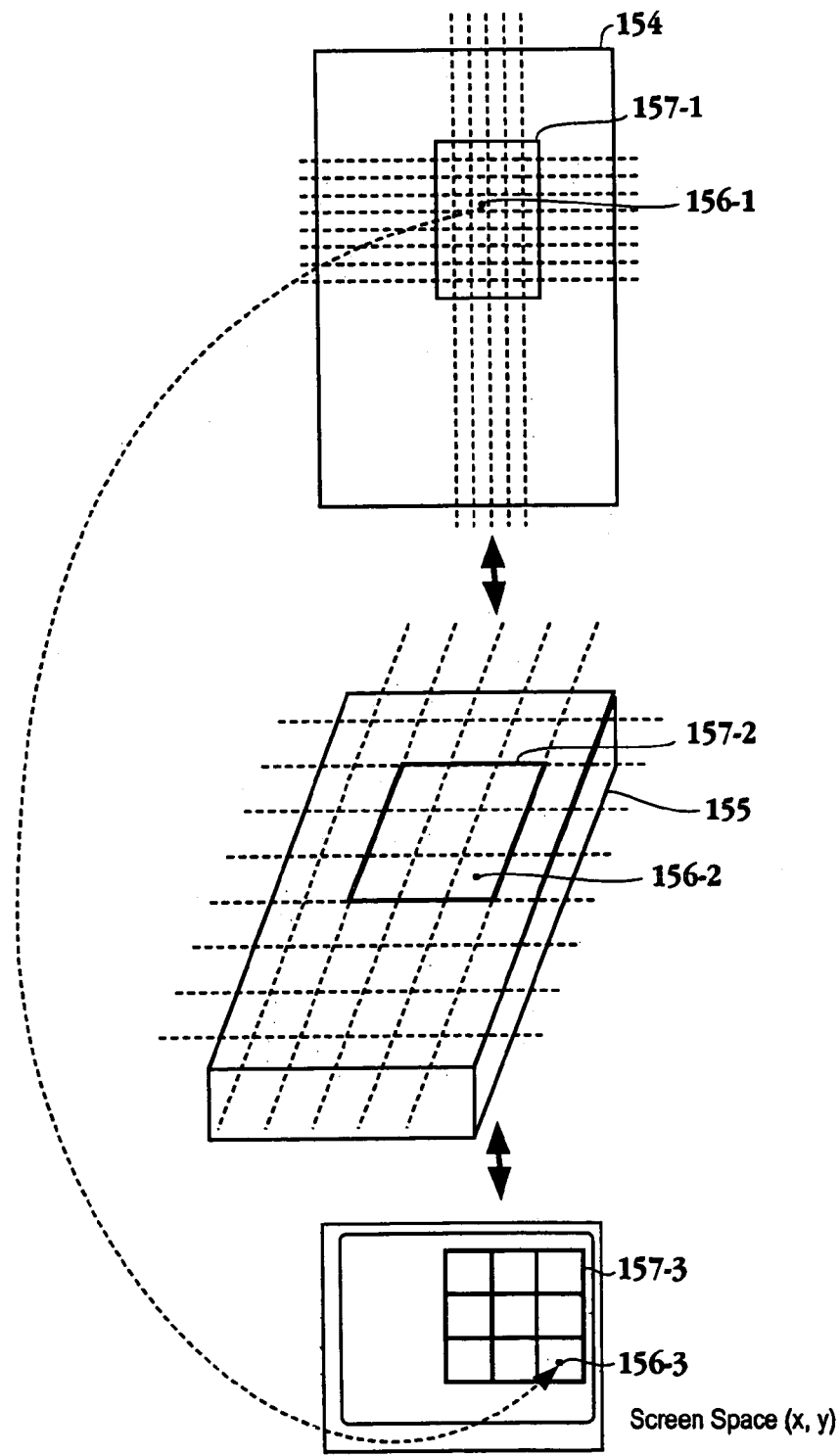
FIG. 7 is a schematic diagram illustrating an alternative representation of the three coordinate spaces of FIGS. 5 and 6.

FIG. 7 is a schematic diagram illustrating an alternative representation of the three coordinate spaces of FIGS. 5 and 6. Texture map 154 includes region 157-1 defined by a plurality of texels. Each texel may include lighting characteristic data for the corresponding texel, wherein the lighting characteristic data is retrievable, i.e., stored in memory with the texel data. For example, point 156-1 represents lighting characteristic data described above that is embedded into the corresponding texel. The lighting characteristic data is derived from the application of a spherical basis function to image 155. As discussed above with reference to FIG. 6, image 155 of FIG. 7 may be a high resolution image, i.e., defined by numerous polygons. Region 157-1 of texture map 154 corresponds to region 157-2 of three dimensional image 155. In addition, the lighting characteristic data represented by point 156-1 is derived from application of a spherical basis function to determine the self shadowing, i.e., the occlusion function, and the self interreflection. It will be apparent to one skilled in the art that the occlusion function determines the visibility, i.e., self-shadowing for a respective point P. The self interreflection data is calculated through ray tracing in one embodiment of the invention. When rendering image 157-3 on a display screen, a look-up of the lighting characteristic data, e.g., the transfer function data, is performed. A dot product between the transfer function (T) data and the illumination function (L) data is calculated to arrive at the intensity for the corresponding pixel, which is then displayed.

It should be appreciated that while FIGS. 6 and 7 illustrate a one to one correspondence between texels and pixels, (142-2 and 142-1. respectively, of FIG. 6, and 156-1, 156-2, and 156-3, respectively, of FIG. 7) the invention is not limited to this relationship. That is, multiple texels may correspond to one pixel, e.g., minification, and alternatively one texel may correspond to multiple pixels, e.g., magnification. Additionally, these resampling operations may be filtered to avoid aliasing artifacts.

Figure 8:
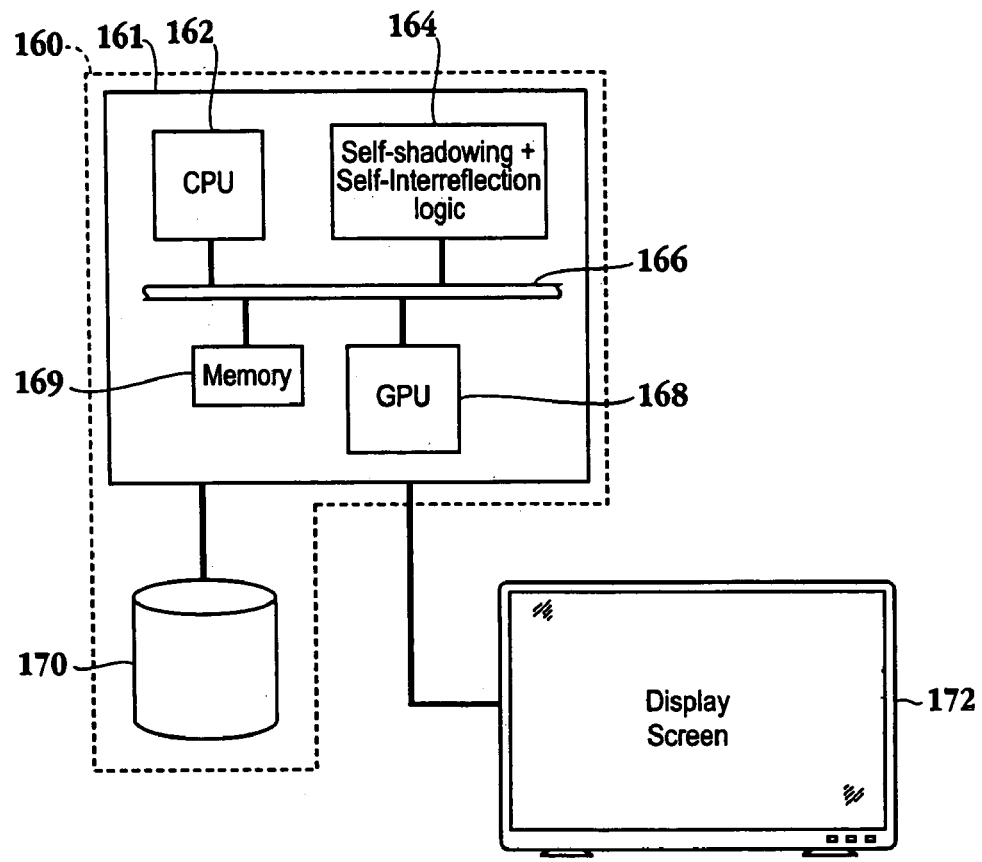
FIG. 8 is a simplified schematic diagram of the computing device capable of providing real time self-shadowing and self-interreflection for objects of an image in accordance with one embodiment of the invention.

FIG. 8 is a simplified schematic diagram of the computing device capable of providing real time self-shadowing and self-interreflection for objects of an image in accordance with one embodiment of the invention. Computing device 160 includes chip 161. Chip 161 includes central processing unit (CPU) 162, memory 169, and graphics processing unit (GPU) 168. In addition, self-shadowing and self-interreflection logic 164 is in communication with CPU 162, memory 169, and GPU 168 over bus 166. Self shadowing and self interreflection logic 164 performs functionality to enable real-time presentation of lighting characteristics by applying the pre-processed lighting and self shadowing effects of a high resolution model to a low resolution model as described herein. It should be appreciated that the pre-processed transfer function data describing a respective light field may be stored in memory 169 along with the texture map data. Computing device 160 includes storage medium 170, which is configured to alternatively store a texture map having texels that include data describing the light field as spherical harmonic coefficients or any other values associated with a suitable spherical basis function. Thus, through a rendering operation where the stored data is combined with the illumination data, an intensity of a pixel associated with a location corresponding to the stored data is calculated. It should be appreciated that the rendering is simplified to a dot product of the coefficients associated with the illumination data and the transfer function data, which in turn, defines a relatively fast calculation. Display screen 172 presents the image defined by computing device 160 using the rendered data. In one embodiment, computing device 160 may be a any suitable video game console, such as the "PLAYSTATION 2"® manufactured by Sony Computer Entertainment Inc. With respect to on-line gaming applications, computing device 160 may be a server.

Figure 9:
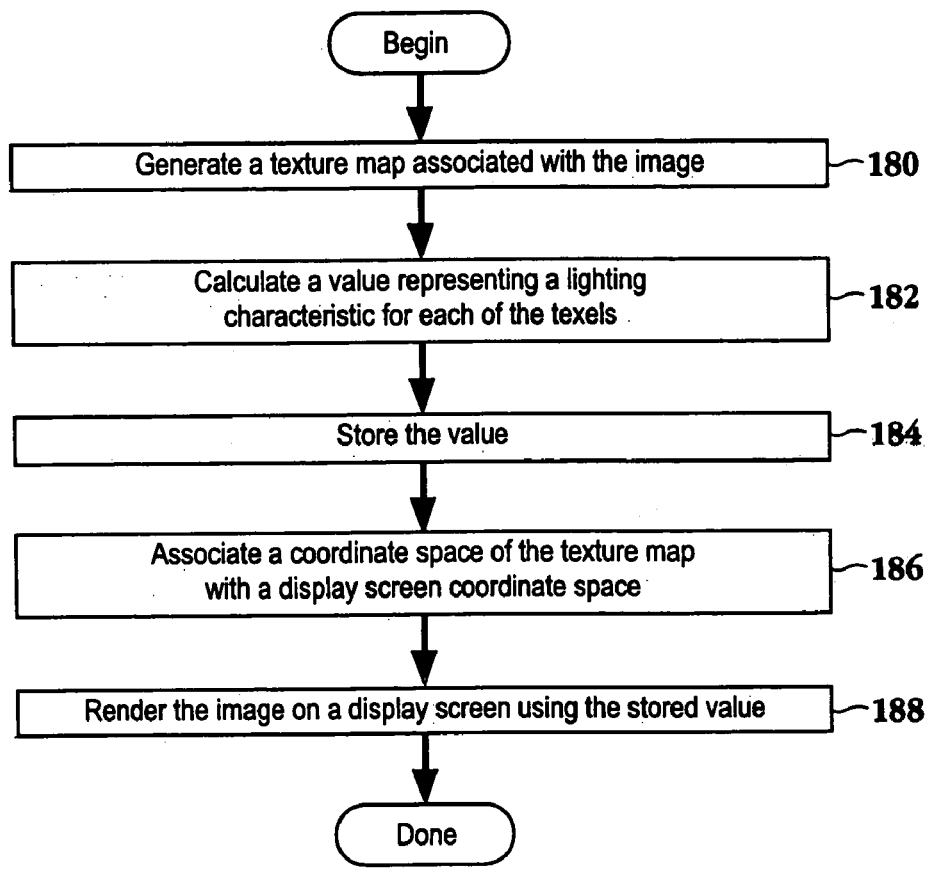
FIG. 9 is a flow chart diagram of the method operations for rendering a low resolution image with high resolution lighting characteristics in real-time in accordance with one embodiment of the invention.

FIG. 9 is a flow chart diagram of the method operations for rendering a low resolution image with high resolution lighting characteristics in accordance with one embodiment of the invention. The method initiates with operation 180 where a texture map associated with the image is generated. The texture map defines a plurality of texels. The method then advances to operation 182 where a value representing a lighting characteristic for each of the texels is calculated. In one embodiment, a spherical harmonic function may be applied as described above and in the article entitled "Spherical Harmonic Lighting: The Gritty Details," which has been incorporated by reference, to calculate the value representing the lighting characteristic. In another embodiment, the value is represented by a number of coefficients corresponding to a transfer function (T) described using directional basis functions. As described above, the transfer function (T) accounts for the self shadows and self interreflection data. In other words, the transfer function represents the surface reflectance. Of course, a value associated with any suitable basis function may represent the lighting characteristics here, e.g., a wavelet transform, a spherical basis function, etc. The method then proceeds to operation 184 where the value calculated in operation 182 is stored on any suitable storage medium. In one embodiment, a value is calculated for each texel of the texture map, e.g., a center point of each texel. The method then moves to operation 186 where a coordinate space of the texture map is associated with a display screen coordinate space. It will be apparent to one skilled in the art that a number of readily-available techniques are provided in order to associate the coordinates of the texture space with the screen coordinate space. The method then advances to operation 188 where the image is rendered on a display screen. Here, the image appears as a high resolution image as described above.

Figure 10:
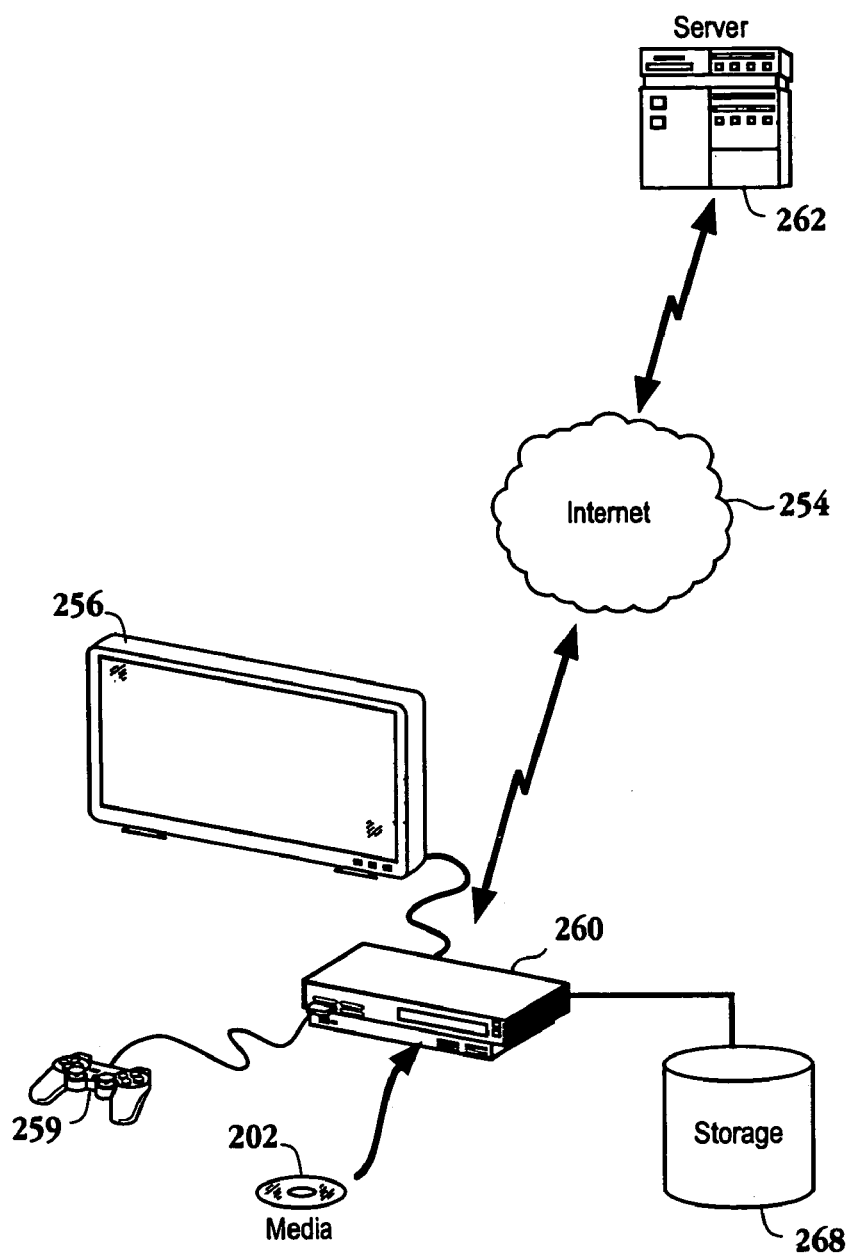
FIG. 10 is a schematic diagram illustrating an on-line gaming application in accordance with one embodiment of the invention.

FIG. 10 is a schematic diagram illustrating an on-line gaming application in accordance with one embodiment of the invention. Game console 260 is shown connected to server 262 through the Internet 254, using any wired or wireless connection. Server 262 may be one or more servers. Controller 259 is in communication with game console 260, which in turn is in communication with display screen 256. Game console 260 includes storage 268 and is configured to accept computer readable media 202. It should be appreciated that the integrated circuit described with reference to FIG. 8 may reside on server 262 or game console 260. Alternatively, software performing the functionality described above may similarly reside on server 262 or game console 260.

In summary, the above described invention describes a method and a system for providing realistic shading for a video presentation in real time. The embodiments described above, pre-process the data using a basis function such as a wavelet or a suitable omni-directional basis function, such as spherical harmonic lighting techniques. The pre-processed data, derived from the calculation of a transfer function, is associated with texture map data and stored in memory. In one embodiment, the transfer function yields data that is rotationally invariant. The stored data is then accessed and combined with an illumination value representing the incoming light, to define realistic shading for the image. In one embodiment, the pre-processed data is associated with a high resolution image, i.e., an image defined by thousands of polygons. Thus, when the shading defined by the pre-processed data is applied to a low resolution image presented on a display screen, the low resolution image appears to have a high resolution.

It should be appreciated that the embodiments described herein may also apply to on-line gaming applications. That is, the embodiments described above may occur at a server that sends a video signal to multiple users over a distributed network, such as the Internet, as described with reference to FIG. 10. The video signal defines images having realistic lighting characteristics that may be generated in real-time.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for rendering an object associated with an image with high resolution lighting characteristics in real time during a video presentation, comprising:
    generating a texture map associated with the image, the texture map defined by texels,
    calculating a value representing a lighting characteristic for each of the texels by sampling a center point of the texel; the calculating including,
        determining a direct illumination transfer function through a biased approximator for a point of the object in real time; and
        determining a secondary lighting contribution in real time, the secondary lighting contribution identified through a series of multiply and add operations, resulting in coefficients that represent surface reflectance; and
        combining the coefficients that represent the surface reflectance with the direct illumination transfer function to render the lighting characteristic;
    storing the value;
    associating a coordinate space of the texture map with a display screen coordinate space; and
    rendering the image on a display screen using the stored value.

2. The method of claim 1, wherein the method operation of calculating a value representing a lighting characteristic for each of the texels includes,
    determining visibility from the center point associated with one of the texels; and
    determining a distribution of an incoming light ray.

3. The method of claim 2, wherein an occlusion function is applied to determine the visibility and ray tracing is applied to determine the distribution of incoming light.

4. The method of claim 1, wherein the method operation of calculating a value representing a lighting characteristic for each of the texels includes,
    defining an image associated with a first resolution; and
    applying a basis function to determine the value.

5. The method of claim 4, wherein the value is represented by multiple coefficients.

6. The method of claim 4, wherein the image on the display screen is associated with a second resolution, the second resolution being less than the first resolution.

7. The method of claim 4, wherein the method operation of applying a basis function to determine the value includes, executing a transfer function to yield the value.

8. A method for incorporating lighting characteristics of an image of an object into a texture map for display in real time during a video presentation, comprising:
    defining a texture map associated with the image;
    determining a lighting characteristic associated with a texel of the texture map by sampling a center point of the texel the determining including,
        determining a direct illumination transfer function through a biased approximator for a point of the object in real time; and
        determining a secondary lighting contribution in real time, the secondary lighting contribution identified through a series of multiply and add operations, resulting in coefficients that represent surface reflectance;
        combining the coefficients that represent the surface reflectance with the direct illumination transfer function to render the lighting characteristic;
    associating the texel with the lighting characteristic; and
    displaying the image of the object according to the lighting characteristic.

9. The method of claim 8, wherein the method operation of determining a lighting characteristic associated with a texel of the texture map includes,
    identifying a point on the object associated with the image; and
    calculating the coefficients through the application of a basis function with the center point.

10. The method of claim 8, wherein the image on the display screen is associated with a first resolution of a model of the object and the image is associated with a second resolution of the model of the object, wherein the first resolution is less than the second resolution.

11. The method of claim 8, wherein the lighting characteristic includes both self shadowing and self interreflection components.

12. The method of claim 8, wherein the method operation of determining a lighting characteristic associated with a texel of the texture map includes,
    calculating the lighting characteristic in a manner such that an intensity of the lighting characteristic does not fluctuate when a light source is moved.

13. A computer readable medium having program instructions for incorporating lighting characteristics of an image associated with an object into a texture map for display in real time during a video presentation, comprising:
    program instructions for defining a texture map associated with the image;
    program instructions for determining a lighting characteristic associated with a texel of the texture map by sampling a center point of the texel the program instructions for determining including,
        program instructions for determining a direct illumination transfer function through a biased approximator for a point of the object in real time; and
        program instructions for determining a secondary lighting contribution in real time, the secondary lighting contribution identified through a series of multiply and add operations, resulting in coefficients that represent surface reflectance;

program instructions for combining the coefficients that represent the surface reflectance with the direct illumination transfer function to render the lighting characteristic;

program instructions for associating the texel with the lighting characteristic; and program instructions for displaying the image of the object according to the lighting characteristic.

14. The computer readable medium of claim 13, wherein the program instructions for determining a lighting characteristic associated with a texel of the texture map includes, program instructions for identifying a point on the object associated with the image and wherein the program instructions for determining the secondary lighting contribution is based on the application of a spherical basis function with the center point of the texel.

15. The computer readable medium of claim 13, wherein the lighting characteristic includes both self shadowing and self interreflection components.

16. The computer readable medium of claim 13, wherein the program instructions for determining a lighting characteristic associated with a texel of the texture map includes, program instructions for calculating the lighting characteristic in a manner such that an intensity of the lighting characteristic does not fluctuate when a light source is moved.

17. An integrated circuit, comprising:

a memory capable of storing data corresponding to a self shadow and self interreflection lighting characteristics associated with an image;

circuitry for accessing the data;

circuitry for determining an intensity associated with a pixel based upon a product of the data and an illumination value, the illumination value derived without calculating the lighting function at triangle corners, the circuitry for determining the intensity including, circuitry for determining a direct illumination transfer function through a biased approximator for a point of the object in real time; and circuitry for determining the self shadow and self interreflection lighting characteristics in real time during a video presentation through a series of multiply and add operations, resulting in the data that represent surface reflectance;

circuitry for combining the coefficients that represent the surface reflectance with the direct illumination transfer function to render the lighting characteristic; and circuitry for enabling presentation of the intensity of the pixel on the display screen.

18. The integrated circuit of claim 17, wherein the image is associated with an object of a video game and the illumination value is derived by a transfer function that samples a center point of a texel of the object.

19. The integrated circuit of claim 17, wherein the integrated circuit is incorporated into a video game console.

20. The integrated circuit of claim 17, wherein the data is associated with a texel of a texture map stored in memory.

21. The integrated circuit of claim 20, wherein a lookup table maps the texel to the pixel.

* * * * *